UNITED STATES PATENT OFFICE.

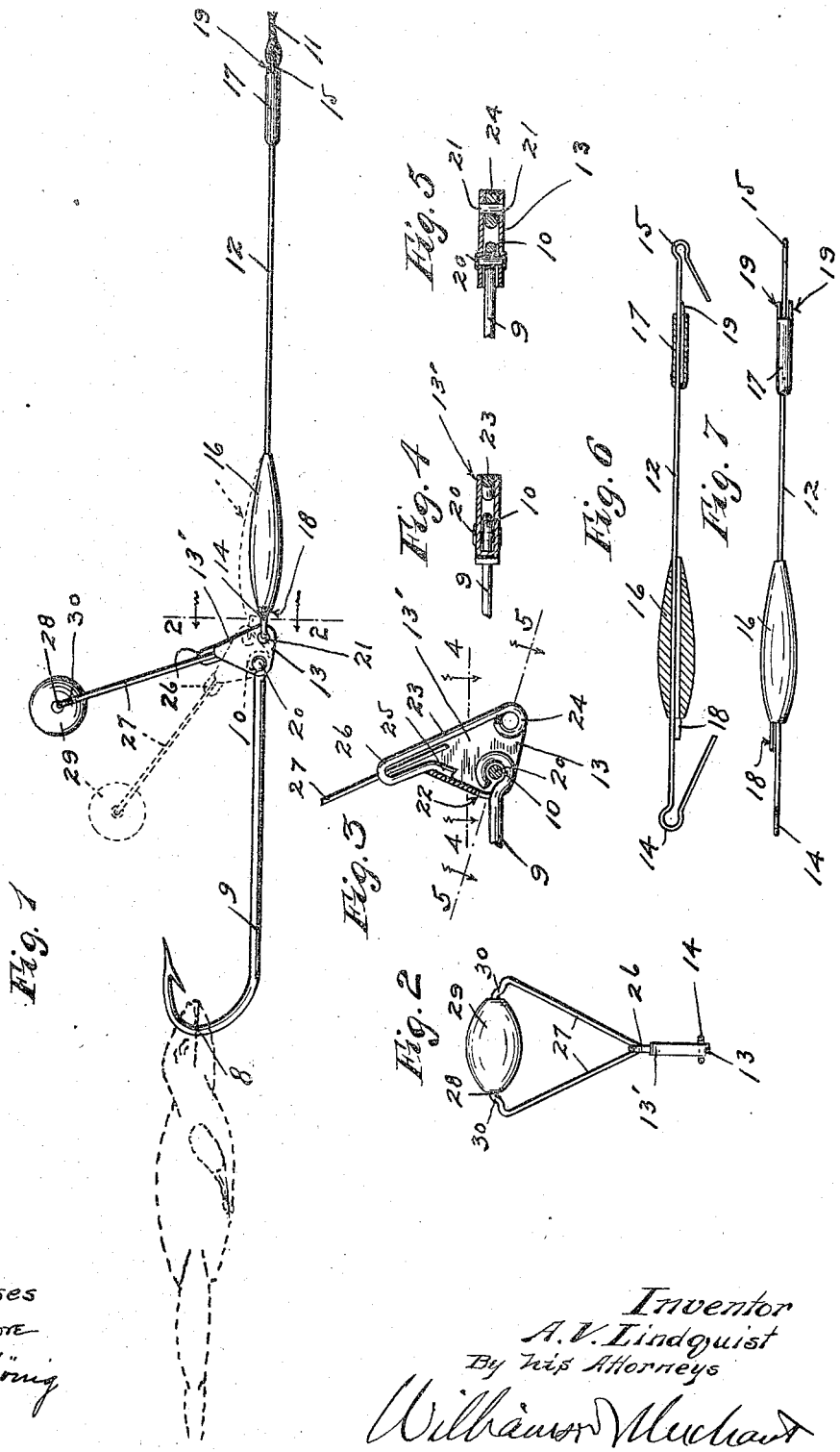

ALBERT V. LINDQUIST, OF ALEXANDRIA, MINNESOTA.

WEEDLESS FISH-HOOK.

1,306,383.

Specification of Letters Patent.

Patented June 10, 1919.

Application filed September 28, 1918. Serial No. 256,001.

*To all whom it may concern:*

Be it known that I, ALBERT V. LINDQUIST, a citizen of the United States, residing at Alexandria, in the county of Douglas and State of Minnesota, have invented certain new and useful Improvements in Weedless Fish-Hooks; and I do hereby declare the following to be a full, clear, and exact description of the invention, such as will enable others skilled in the art to which it appertains to make and use the same.

My invention relates to improvements in weedless fish hooks and has for its object to provide a guard for the hook that will not in any way interfere with the strike of the fish, and at the same time fully protect the hook against entanglement with weeds. A further object of the invention is to provide means for holding the hook in an upright position above the shank thereof to cause the bait to remain in an upright or normal position. In this position of the bait, the same will not form an obstruction when the fish strike. A still further object of the invention is to provide a weedless fish hook that is strong and durable in construction.

To the above ends, generally stated, the invention consists of the novel devices and combinations of devices hereinafter described and defined in the claims.

The invention is illustrated in the accompanying drawings wherein like characters indicate like parts throughout the several views. Referring to the drawings, Figure 1 is a side elevation of the improved weedless fish hook with some parts shown in different positions by means of broken lines and also illustrating, by means of broken lines, a frog secured to the hook;

Fig. 2 is a view partly in elevation and partly in section taken on the line 2—2 of Fig. 1;

Fig. 3 is a fragmentary detail view on an enlarged scale with some parts shown in side elevation and some parts sectioned;

Fig. 4 is a detail view in section taken on the line 4—4 of Fig. 2;

Fig. 5 is a detail view in section taken on the line 5—5 of Fig. 3;

Fig. 6 is a view of the leader partly in elevation and partly in longitudinal section; and Fig. 7 is a plan view of the leader as shown in Fig. 6.

The numeral 8 indicates a fish hook, the shank 9 of which has in its outer end an eye 10. A fish line 11 is attached to a leader 12 and said leader, in turn, is attached to the fish hook by a link 13. It may be here stated that from a broad point of view the leader 12 is a part of the fish line.

The leader 12, as shown, is in the form of a wire, the ends of which are folded upon themselves and bent to afford an eye 14 and an eye 15. The free ends of the leader 12 are secured to the body thereof, inward of the eyes 14 and 15, by a sleeve-like weight 16 and a sleeve 17, respectively. On the outer end of the weight 16 is a prong 18 adapted to be folded through the eye 14 for holding said weight over the respective free end of the leader 12 and against endwise sliding movement thereof. Also, on the outer end of the sleeve 17, are two diametrically opposite prongs 19 adapted to be folded into the eye 15 to hold said sleeve over the respective free end of the leader 12 and against endwise sliding movement thereof. The inner ends of the weight 16 and sleeve 17 are tapered to prevent the same from catching on weeds or other obstructions. The fish line 11 is secured to the eye 15. For surface fishing, the weight 16 may be dispensed with and a sleeve similar to sleeve 17 substituted therefor.

The link 13 has an edge extension 13' and is formed together with said extension from a single piece of metal folded upon itself to afford a pair of laterally spaced side members. The eye end of the shank 9 is inserted between side members of the link at one end thereof, and secured thereto by a pivot pin 20 in the form of a rivet passed through a pair of alined holes in the respective end of the link and through the eye 10 of the shank 9. In the other end of the shank is a pair of alined holes 21 with which the eye 14 of the leader interlocks to flexibly connect said leader to the link, which link, in turn, is flexibly connected to the fish hook by the pivot pin 10. The inner end of the transverse folded portion of the link 13 and its extension 13' between the side members thereof, affords a stop 22 arranged to engage the shank 9 for a purpose that will presently appear. The link extension 13' is offset from the shank 9 in the same direction therefrom as the hook 8.

A reinforcing wire 23 is laid between the side members of the link and its extension at the free edges thereof. One end of this wire 23 is bent to form an eye 24 that is axially alined with the eyes 21 through which the eye 14 also extends. The other end of the wire 23 is bent to form a hook 25 which engages the inner face of the transverse portion of the link and its extension. The inner portion of the wire 23 is folded upon itself to afford an open loop 26 which extends outward of and above the link extension 13'.

A guard for the hook is rigidly secured to the link connection between the shank of the hook and the leader. This guard, as shown, is in the form of a single piece of wire bent to form a pair of diverging arms 27, the outer ends of which are connected by a transverse member 28. The ends of the guard arms 27 are inserted longitudinally into the loop 26 of the reinforcing wire 23 from opposite sides thereof and between the side members of the link extensions 13'. The side members of the link 13 and its extension 13', reinforcing wire 23 and guard arms 27 are all rigidly connected by solder, or otherwise.

A float 29 of cork or other suitable material is loosely journaled on the guard member 28 transversely of the hook shank 9, with freedom for rotation longitudinally of said hook. To hold the float 29 against endwise movement on the guard member 28, said member is bent to form shoulders 30 outward of the ends of said float.

It is, of course, understood that the float may be carried by a guard in the form of a single straight member or wire extending from the link. It is also understood that the reinforcing wire 23 forms a part of the guard and in some instances may be formed integral therewith. The float will hold the hook in an upright position, as shown in Fig. 1 and in which position of the hook the bait will remain in an upright and natural position and, therefore, will not form an obstruction when the fish strikes. In trolling the hook, the pull on the like connection, either from the line or weighted leader will hold the guard, with respect to the hook, as shown in Fig. 1. In this position of the guard, the hook is entirely free to receive the strike of the fish. In case the guard strikes a weed, the same will move toward the hook to a greater or less degree, as indicated by broken lines in Fig. 1, and as soon as the weed is passed, said guard will immediately be returned to normal position. The length of the guard may, of course, be varied, at will, to bring the float in different positions in respect to the point of the hook.

In some instances, the float may be dispensed with and as previously stated, the weight on the leader may also be dispensed with in surface fishing. From the above description, it is evident that the above described weedless fish hook is very strong and durable.

What I claim is:

1. The combination with a fish hook, of a leader, a link pivotally connecting the shank of the hook to the leader in longitudinal alinement therewith but free to move into angular positions on either side of the extended longitudinal axis of the leader, and a guard for the hook secured to the link and normally extending outward of the point of the hook with freedom to move toward the same.

2. The combination with a fish hook, of a leader, a link pivotally connecting the shank of the hook to the leader in longitudinal alinement therewith but free to move into angular positions on either side of the extended longitudinal axis of the leader, a guard for the hook secured to the link and normally extending outward of the point of the hook with freedom to move toward the same, and a stop on the link arranged to engage the shank of the hook to limit the bodily movement of the guard toward the hook.

3. The combination with a fish hook, of a link formed from a piece of sheet metal folded upon itself to afford a pair of laterally spaced side members, said side members at one end of the link embracing the eye end of the shank of the fish hook and pivoted thereto, said side members having in the other end a pair of alined eyes, a reinforcing wire secured within the open edge portion of the link, one end of the reinforcing wire being bent to form an eye alined with said pair of eyes, and a guard for the fish hook having its inner end inserted between the side members of the link and secured thereto and to the reinforcing wire.

4. The combination with a fish hook, of a link formed from a piece of sheet metal folded upon itself to afford a pair of laterally spaced side members, said side members at one end of the link embracing the eye end of the shank of the fish hook and pivoted thereto, said side members having in the other end a pair of alined eyes, a reinforcing wire secured within the open edge portion of the link and the other end thereof being extended back of the transverse portion of the link proper, the intermediate portion of the reinforcing wire being folded upon itself to afford a loop extending outward of the link, and a guard having its inner end inserted within said loop and between the side members of the link and secured thereto.

5. The combination with a fish hook, of a leader, a link pivotally connecting the leader to the shank of the hook, a guard for the hook secured to the link, and a float mounted on the guard to revolve in planes longitudinally of the shank of the hook.

6. The combination with a fish hook, of a leader, a link pivotally connecting the leader to the shank of the hook, a guard for the hook comprising a pair of diverging arms secured to the link, and a float located between the diverging arms of the guard and carried thereby.

7. The combination with a fish hook, of a leader, a link pivotally connecting the leader to the shank of the hook, a guard for the hook comprising a pair of diverging arms secured to the link, and a float located between the diverging arms of the guard and carried thereby for rotation in planes longitudinally of the shank of the hook.

In testimony whereof I affix my signature in presence of two witnesses.

ALBERT V. LINDQUIST.

Witnesses:
MATILDA E. LINDQUIST,
W. K. BARNES.